Aug. 30, 1927. 1,640,764
F. GLEIM
CARRIAGE MOVING MECHANISM FOR TYPEWRITERS AND ADDING MACHINES
Filed March 19, 1927 2 Sheets-Sheet 1
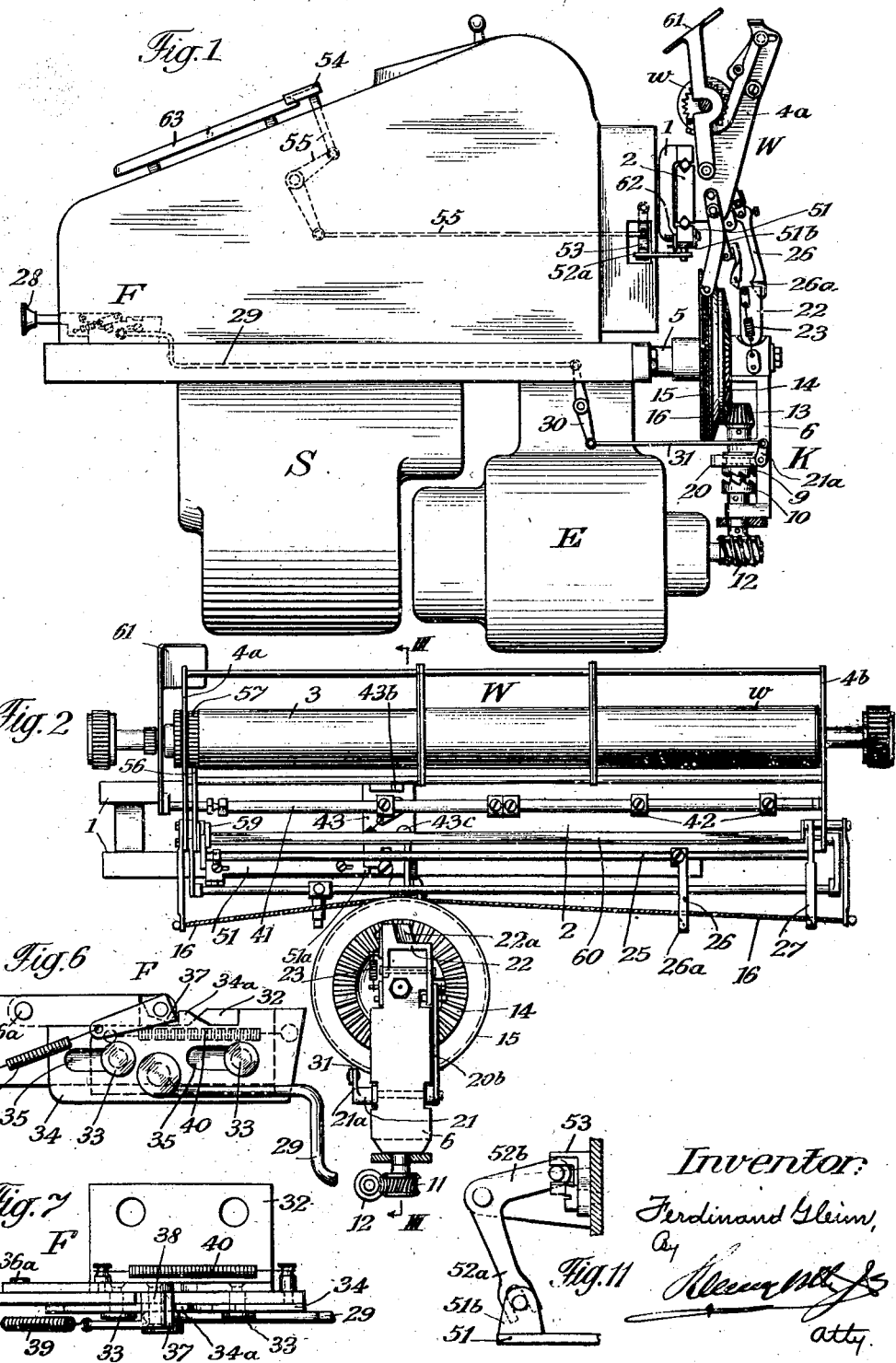
Inventor:
Ferdinand Gleim,
by
atty.

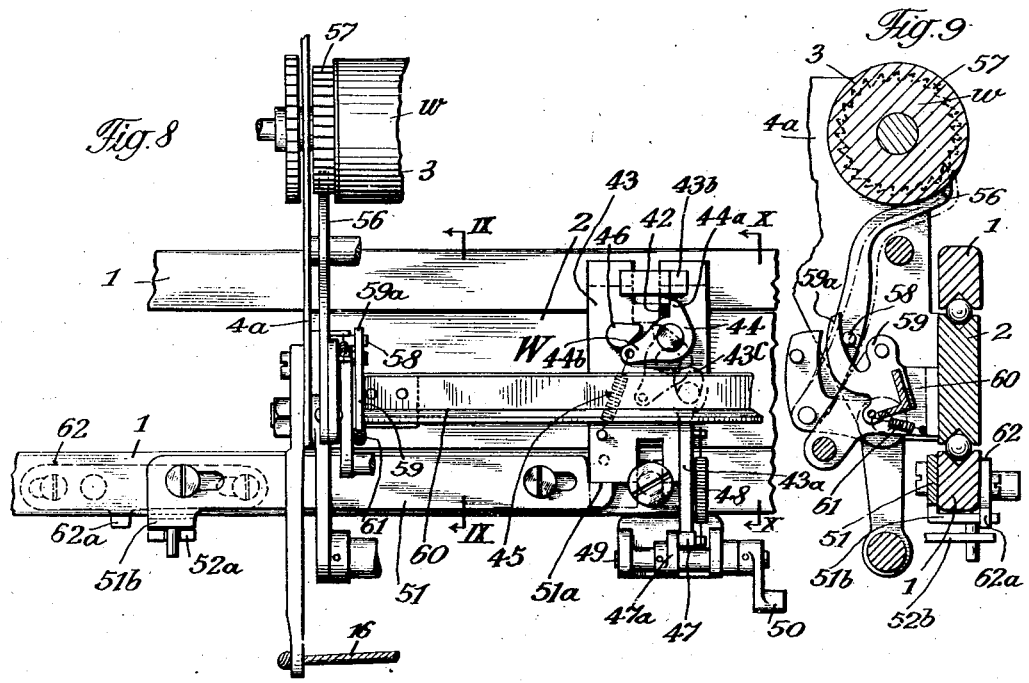

Patented Aug. 30, 1927.

1,640,764

UNITED STATES PATENT OFFICE.

FERDINAND GLEIM, OF SCHAFFHAUSEN, SWITZERLAND, ASSIGNOR TO THE FIRM WALES ADDING MACHINE COMPANY, OF SCHAFFHAUSEN, SWITZERLAND.

CARRIAGE-MOVING MECHANISM FOR TYPEWRITERS AND ADDING MACHINES.

Application filed March 19, 1927, Serial No. 176,694, and in Germany April 20, 1925.

The present invention refers to improvements in carriage moving mechanisms or carriage return mechanisms for typewriters and adding machines.

In such machines it has already been proposed to effect the drive by means of a continuously rotating electric motor arranged at the machine frame and operatively connected to the carriage by means of a clutch arrangement including a reversing gear or a single or a two-fold cord transmission. These proposals have the drawback to cause vibrations and shocks of the machines if no special springs are provided for cushioning shocks produced by the motor, further interruptions in the working by jamming or lost motion in the clutch device occur which detrimentally influence the degree of accuracy required with adding machines.

These drawbacks shall now be overcome by the subject matter of the present invention.

According to the present invention the movement is transmitted from a clutch device arranged in the center of the width of the machine frame to the carriage by means of a bipartite cord drive and in the latter a single spring tightened by the motor during the return movement of the carriage is provided, said spring serving for moving the carriage during the calculating as well as for tightening the said cord and for damping the start of the movement of the carriage.

Preferably the arrangement is such that at the machine frame a bevel wheel drive actuated by the driving motor by the intermediary of a jaw clutch is provided, and the cord of the bipartite cord drive being slung around the driven bevel wheel which encloses the actuating spring fixed to the axle of the wheel, whereby the end of the part of the cord which is tensioned when the carriage moves forward is attached to an arm of a double armed lever mounted on the bevel wheel the actuating spring acting on the other arm.

A constructional example of the subject matter of the present invention is illustrated on the accompanying drawings, in which:

Fig. 1 shows in a side elevation a "Wales" adding machine,

Fig. 2 shows on the same scale an end view of the carriage and of the driving device seen from the right in Fig. 1, Figs. 3, 4 and 5 show on a larger scale the clutch device in particular, Fig. 3 is a vertical section along line III—III in Fig. 2, Fig. 4 is a view of the interior of the spring casing and Fig. 5 is a horizontal section along line V—V in Fig. 3 through the clutch sleeve, Figs. 6 and 7 show on a larger scale and in a plan view and a side elevation respectively the key for operating the clutch device, Figs. 8, 9, 10 and 11 show the mechanism for locking the column spacing device or tabulator in particular, Fig. 8 is a rear view of some parts, Fig. 9 is a section along line IX—IX in Fig. 8, Fig. 10 is a section along line X—X in Fig. 8 and Fig. 11 shows a detail in a side view.

In the drawing a Wales-adding machine of the known type is shown and only those parts of this machine which are necessary for the comprehension of the present invention are illustrated.

At the rear part of the machine frame the guidance 1 of U-shaped cross-section is fixed, and on rollers provided in said guidance the carrier body 2 of the carriage W is slidable. The platen 3, the line spacing mechanism, paper feed rollers and the like are provided on the carriage and are mounted directly or indirectly in the side shields 4$^a$ and 4$^b$ which seen from the rear of the machine are situated to the right and to the left hand side of the carrier body. Below the carriage and in the center of the machine frame the coupling device K is arranged. From the rear of the machine frame a supporting pin 5 projects to which the bracket 6 is screwed. In the latter two axles 7 and 8 are mounted with their axes in alignment, which carry at their adjacent ends parts 9 and 10 respectively of a claw clutch. To the lower end of the axle 8 a worm wheel 11 is fixed which cooperates with a worm 12 arranged on the shaft of an electromotor E adapted to drive the carriage. On the axle 7 a bevel wheel 13 is secured which is in mesh with a larger bevel wheel 14 forming the cover of a casing 15 containing the spring. The spring casing 15 and bevel wheel 14 are rotatably mounted on the support pin 5 and the circumference of the casing 15 is provided with a groove in which a bipartite cord 16 is housed. One part of the cord is fixed with its one end to the casing 15 and is then slung around the casing 15 and fixed with its other end to one end of the carriage, whilst the other part of the cord is fixed with its one end to the other end of the carriage and with its other end to one arm of a double armed lever 17 pivoted in the spring casing 15. To the other arm of the lever 17 the end of a powerful tensioned spiral spring 18 is fixed and the other end of the latter is secured to a disc 19 keyed to the pin 5. The upper clutch part 9, which is longitudinally displaceable on the axle 7 and secured against rotation by a key is provided with a circumferential groove $9^a$ with which two rollers $20^a$ arranged diametrically opposite each other in the coupling fork 20 cooperate (Fig. 5). An arm $20^b$ extending in the upward direction is fixed to the fork 20 and is provided at its upper end with a pin engaging a slot of a swingably mounted member 22, the latter occupies the position shown in Fig. 3 when the jaw clutch is disengaged and is inclined by the same amount towards the other side of the vertical when the jaw clutch is in engagement, a laterally arranged tension spring 23 (Fig. 1) causes the member 22 to be suddenly and powerfully displaced and to occupy one or the other inclined position in which it is held by stops. A tension spring 24 causes the arm $20^b$ with its pin to bear continuously and strongly against the member 22. The latter is provided with an abutment face $22^a$ arranged at an angle of 45° to the lateral shanks; a pressure or impact in the direction of the pivot of the member causes the latter to be displaced from its left-hand position in which the clutch 9, 10 is engaged to its right-hand position whereby the clutch is disengaged. The disengagement of the clutch occurs thus automatically. To this end a rod 25 is mounted in the longitudinal direction of the carriage on which an adjustable stop 26 is provided, whilst the right hand supporting arm of the rod 25 serves as a fixed stop 27 similar to stop 26 and being also provided with a facing $26^a$ slanting at 45° and being parallel to the facing $22^a$ of the member 22 and projecting into the path of the latter facing, whereby when the carriage moves towards the left (looking at the back of the machine) the facing $26^a$ contacts with the facing $22^a$ and displaces the member 22 and disengages the clutch. The clutching of the clutch is performed by hand by means of a key 28 projecting in front of the machine. This key is operatively connected to the clutch fork 20 by means of a connecting rod 29, double armed lever 30, rod 31 and arm $21^a$.

In order to prevent that a prolonged pressure on the key 29 prevents the disengagement of the clutch a special lost motion device F (Figs. 6 and 7) is inserted in the connecting rod of the key. To the machine frame and near the key 28 an angular piece 32 is screwed having two lateral pins 33 provided with heads on which a sliding piece 34, provided with horizontal slots 35 through which the pins 33 pass, is guided. The angular piece 32 is provided at its upper edge with a raised portion and an ascending part and the sliding piece is provided with a tooth $34^a$ arranged at the same height as the ascending part. To the lower part of the sliding piece 34 the rod 29 is linked, whilst to the front part of a support 36 for pawls, displaceably arranged between the sliding piece 34 and the angular piece 32, the key 28 is fixed. On the support 36 the pawl 37 is pivoted at $36^a$ which projects by means of a cross-member 38 over the sliding piece 34 and the pawl 37 is provided with an arm with which a tension spring 39, that is fixed at its other end, is connected. A tensioned spring 40 keeps the key 28 in its position of rest at a distance from the machine casing. If the key is depressed in order to cause a moving of the carriage towards the right the pawl 37, 38 bears against the tooth $34^a$ and displaces the sliding piece 34 towards the rear, whereby the rod 29 effects the engagement of the clutch K. Thereby the pawl 37 moves up the ascending portion on to the higher edge of the stationary angular piece 32 out of engagement with the tooth $34^a$ and the rod 29. The automatic disengagement of the clutch may occur at any moment, even if the key 28 is kept depressed in that moment as the sliding piece 34 which moves in the forward direction has its movement not objected to.

The manner of operation of the above described device is as follows:

When the key 28 is depressed the clutch K is engaged and by means of the bevel gear drive 13, 14, double armed lever 17, spring 18 and cord 16 the carriage as pulled towards the left (i. e. towads the right when looked at by the operator), until the clutch is disengaged by the abutment against the stop 16 and the carriage is arrested. Thereby the spring 18 has been tensioned so that it moves the carriage towards the left (seen from the operator's place) in a step by step manner controlled by the tabulator mechanism. As the spring 18 acting upon the double lever 17 is always inserted between the driving and the driven members the movement of the carriage in either direction occurs in a yielding manner which excludes shocks, whereby the motor and the carriage is saved. Simultaneously the arrangement of the double armed lever 17 causes the right hand part of the cord 16 (seen from the back) to be always kept under tension, whilst the left hand part of the cord is also tensioned by the spring tending to pull the carriage towards the right.

In order to arrest the movement of the carriage in determined positions corresponding to the desired columns between the side shields $4^a$ and $4^b$ a so-called stop-bar is provided, i. e. a bar 41 provided with screw thread, on which stops 42 displaceable according to the desired stopping positions are screwed, the stops being adapted to cooperate with a catch on the carriage. At the guide part 1 of the carriage frame a slide 43 adapted to be vertically displaceable is provided on which the catch 44 is pivoted and held in an initial position by the action of a tension spring 45 and having an extension $44^b$ resting against an abutment 46 where its nose $44^a$ abuts against a stop 42. The slide 43 is provided with an extension $43^a$ projecting in the downward direction and bearing with its end against a roller 47 by the action of a spring 48. The roller 47 is mounted on an arm $47^a$ which is arranged on an axle 49 mounted on the guide part 1, the gear of the machine cooperating in a known manner on an arm 50 fixed on the axle 49, whereby an upward and downward movement of the slide is effected. When the slide is moved in this manner in the downward direction the catch $44^a$ leaves the stop 42 and rests instead on the nose $43^b$ of the slide so that the carriage remains further arrested until an entry or an addition in the respective column has been made, whereupon the gear of the machine moves the slide 43 in the upward direction so that the carriage is now free to move until it is retained by a stop corresponding to the next column whereupon the same procedure is repeated. If now the line-spacing of the platen has to be operative this is effected by preventing the downward movement of the slide 43. To this end a longitudinally displaceable catch 51 is arranged on the lower guide cheek 1 the nose $51^a$ of which locks the slide 43 in its upper position. The catch 51 is provided with an extension $51^b$ and a pin with which a forked arm $52^a$ of a bell crank lever cooperates, the other arm $52^b$ of the bell crank lever carrying at its free end a pin with which a lever 53 cooperates (Fig. 11). This lever 53 is turned by means of connecting rods 55 by the key 54 and a turning of the catch is caused thereby.

The key 54 is situated above the key 63 for cutting in and out the current. A pressure on the key 54 depresses also the key 63; the machine is thereby rendered operative, however a sudden movement of the carriage into the next column is prevented and a line spacing of the platen occurs.

To this end the usual pusher pawl 56 is provided on the carriage which cooperates with the line spacing ratchet wheel 57 and turns the platen by one tooth by means of the known ratchet mechanism (Figs. 9 and 10) which is not described in detail. The line spacing has not to be operative when the carriage suddenly moves from one column into the next which is obtained by bringing the pusher pawl 56 out of engagement with the ratchet wheel 57. A pin 58 is provided on the pawl 56 with which the tongue $59^a$ of a plate 59 cooperates. The latter is fixed to the end of a bar 60 of angular cross-section displaceably mounted between the shields $4^a$ and $4^b$ and is displaced by a cam $43^c$ when the slide 43 is moved in the downward direction whereby the tongue $59^a$ is so turned that the pawl 56 is brought into the position shown in chain-dotted lines in which it is out of engagement with the ratchet wheel. The spring 61 causes the bar 60 to be returned into its normal position when the slide 43 returns.

If it is intended to pull the carriage by hand over the whole width of the machine, this may be done in a known manner by turning the stop bar 41 by means of the key 61, on which the bar is mounted, whereby the stops 62 are moved out of the path of the catch 44.

If it is intended to have the slide 43 locked in the same column for a continued addition the catch 51 is locked by means of a special locking member 62 at the rear side of the lower guide cheek 1, the catch 51 bearing on the nose $62^a$ of the locking member.

I claim:

1. Carriage moving mechanism for typewriters, adding machines and the like, comprising in combination, a continuously rotating electric-motor and driving connections between said motor and the carriage including a clutch, a bipartite cord and a spring interposed in said two parts of the cord and adapted to tension said cord drive and to cushion shocks in the starting movement of the carriage.

2. Carriage moving mechanism for typewriters, adding machines and the like, comprising in combination, a continuously rotating electric-motor, and driving connections between said motor and the carriage including a clutch, two cooperating bevel wheels, a spiral spring operatively connected to one of said bevel wheels, a cord consisting of two parts, both of these parts being slung around said bevel wheel, and a two-armed lever to one arm of which one end of one part of the cord is connected and to the other arm one end of said spiral spring is connected, said lever being mounted on said bevel wheel.

3. Carriage moving mechanism for typewriters, adding machines and the like, comprising in combination, a continuously rotating electric motor, and driving connecincluding a clutch, a bevel wheel drive comprising two bevel wheels of which the driven wheel is constructed as a casing, an axle about which said driven wheel is turnable, a spiral spring enclosed in said casing, a two-armed lever fulcrumed on said casing, one end of said spring being connected to said axle and the other end being connected to one arm of said lever, a cord passing around said casing and having one end fixed to the latter and the other end fixed to the carriage, another cord passing around said casing and having one end fixed to the other arm of said lever and the other end to said casing.

4. Carriage moving mechanism for typewriters, adding machines and the like, comprising in combination, a continuously rotations between said motor and the carriage tating electric-motor, and driving connections between said motor and the carriage including a clutch, a fork cooperating with said clutch for engaging and disengaging the latter, a rocking member operatively connected to said fork for operating the latter and provided with an inclined abutment facing, a trip member displaceably fixed on the carriage and having a correspondingly shaped abutment facing cooperating with the first mentioned facing for causing a disengaging of the clutch, and a bipartite cord and a spring interposed in said two parts of the cord and adapted to tension said cord drive and to cushion shocks in the starting movement of the carriage.

In testimony whereof, I have signed my name to this specification.

FERDINAND GLEIM.